(12) United States Patent
Chella et al.

(10) Patent No.: US 11,297,138 B2
(45) Date of Patent: Apr. 5, 2022

(54) TECHNIQUES FOR DYNAMICALLY BENCHMARKING CLOUD DATA STORE SYSTEMS

(71) Applicant: NETFLIX, INC., Los Gatos, CA (US)

(72) Inventors: Vinay Chella, Santa Clara, CA (US); Ioannis Papapanagiotou, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 1479 days.

(21) Appl. No.: 15/394,448

(22) Filed: Dec. 29, 2016

(65) Prior Publication Data
US 2018/0060154 A1    Mar. 1, 2018

Related U.S. Application Data (60) Provisional application No. 62/382,209, filed on Aug. 31, 2016.

(51) Int. Cl.
    *G06F 15/173*    (2006.01)
    *H04L 67/1097*   (2022.01)
    *G06F 11/34*     (2006.01)

(52) U.S. Cl.
    CPC .......... *H04L 67/1097* (2013.01); *G06F 11/34* (2013.01); *G06F 11/3414* (2013.01); *G06F 11/3428* (2013.01); *G06F 11/3452* (2013.01)

(58) Field of Classification Search
    CPC .. G06F 11/34; G06F 11/3404; G06F 11/3428; G06F 11/3433; G06F 11/3447; G06F 11/3452
    See application file for complete search history.

(56) References Cited

U.S. PATENT DOCUMENTS

| | | | |
|---|---|---|---|
| 9,378,784 B1 * | 6/2016 | Vu | H04L 49/9078 |
| 9,578,093 B1 * | 2/2017 | Gotoh | G06F 11/3006 |
| 10,379,904 B2 * | 8/2019 | Weissmann | G06F 9/4806 |
| 2007/0110046 A1 * | 5/2007 | Farrell | H04L 69/16 |
| | | | 370/389 |
| 2015/0339168 A1 * | 11/2015 | Mason | G06F 9/5027 |
| | | | 718/104 |

* cited by examiner

*Primary Examiner* — Yves Dalencourt
(74) *Attorney, Agent, or Firm* — Artegis Law Group, LLP (57) ABSTRACT

In various embodiments, a benchmarking engine automatically tests a data store to assess functionality and/or performance of the data store. The benchmarking engine generates data store operations based on dynamically adjustable configuration data. As the benchmarking engine generates the data store operations, the data store operations execute on the data store. In a complementary fashion, as the data store operations execute on the data store, the benchmarking engine generates statistics based on the results of the executed data store operations. Advantageously, because the benchmarking engine adjusts the number and/or type of data store operations that the benchmarking engine generates based on any changes to the configuration data, the workload that executes on the data store may be fine-tuned as the benchmarking engine executes.

21 Claims, 4 Drawing Sheets

TECHNIQUES FOR DYNAMICALLY BENCHMARKING CLOUD DATA STORE SYSTEMS

CROSS-REFERENCE TO RELATED APPLICATIONS

This application claims the priority benefit of the United States Provisional Patent Application having Ser. No. 62/382,209 and filed on Aug. 31, 2016. The subject matter of this related application is hereby incorporated herein by reference.

BACKGROUND OF THE INVENTION

Field of the Invention

Embodiments of the present invention relate generally to computer science and, more specifically, to techniques for dynamically benchmarking cloud data store systems.

Description of the Related Art

Many software applications rely on external services known as "cloud data stores," which are systems that execute on cloud computing platforms and are designed to store and manage collections of client data. Examples of cloud data stores include Netflix Dynomite, Apache Cassandra, and Amazon Elastic File System, to name a few. Oftentimes, the overall functionality and performance of applications that rely on cloud data stores correlate to the functionality and performance of the cloud data stores themselves. Thus, to evaluate the applications, the cloud data stores also need to be evaluated. However, executing a complex application or system of applications across a wide range of operating conditions to evaluate the functionality and performance of a cloud data store or to compare multiple cloud data stores for a variety of use cases is prohibitively time consuming.

To reduce the time required to evaluate the functionality and performance of a cloud data store, an engineer may implement a benchmarking engine instead of an application or system of applications to test the cloud data store. In operation, the benchmarking engine typically generates different workloads that can be executed on the cloud data store. Workload operations that execute on the cloud data store are referred to herein as "data store operations." During testing, as various data store operations execute on the cloud data store, the benchmarking engine monitors the performance of the cloud data store. In general, the workloads are designed to emulate loads on the cloud data store for one or more use cases. For example, to emulate the load on a cloud data store while a video streaming service responds to clients during evening hours, the benchmarking engine could generate and execute a workload that is characterized by a high number of read operations per second. In another example, to emulate the load on a cloud data store during a denial of service attack, the benchmarking engine could generate and execute a workload that includes a dramatic spike in a number of read operations per second.

One limitation of a typical benchmarking engine is that the workloads cannot be adjusted while the benchmarking engine executes. Thus, the workloads cannot be dynamically updated based on the performance of the cloud data store during any given testing scenario. For example, an engineer could determine that a current workload exceeds the throughput of the cloud data store and, therefore, want to reduce the number of data store operations per second. However, with a conventional benchmarking engine, the engineer would not be able to adjust the number of data store operations per second without terminating the benchmarking engine, configuring the benchmarking engine to generate a new workload, and re-executing the benchmarking engine. Re-configuring and re-executing the benchmarking engine to modify the workload can dramatically increase the time required to evaluate the cloud data store.

Another limitation of a typical benchmarking engine is that the benchmarking engine usually executes for a predetermined amount of time and then terminates. Thus, evaluating the performance of a cloud data store with respect to an application that rarely terminates is quite difficult. For example, conventional benchmarking engine testing likely would not be able to detect or indicate the presence of a memory leak that incrementally reduces the amount of available application memory over long periods of time. Such memory leaks could be quite problematic because they could cause a long-running application to terminate unexpectedly. Among other things, the architecture of a conventional benchmarking engine typically constrains the length of time that the benchmarking engine can successfully execute without overflow errors, etc.

As the foregoing illustrates, what is needed in the art are more effective techniques for benchmarking cloud data stores.

SUMMARY OF THE INVENTION

One embodiment of the present invention sets forth a computer-implemented method for testing a data store. The method includes processing one or more workload generation operations to generate first data store operations based on first configuration data; executing at least one of the data store operations included in the first data store operations on a data store to obtain first statistics that are associated with a performance of the data store; while continuing to process the one or more workload generation operations, receiving second configuration data, modifying the one or more workload generation operations to generate second data store operations based on the second configuration data, executing at least one of the data store operations included in the second data store operations on the data store to obtain second statistics that are associated with the performance of the data store; and displaying or transmitting for further processing at least one of the first statistics and the second statistics.

One advantage of the disclosed techniques is that, unlike conventional testing techniques, the workload generation operations may be modified without terminating the workload generating operations. Consequently, a user may adjust the workload based on statistics that are generated as the data store executes the workload. Fine-turning the workload as the data store executes the workload can dramatically reduce the time required to evaluate the performance of the data store.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
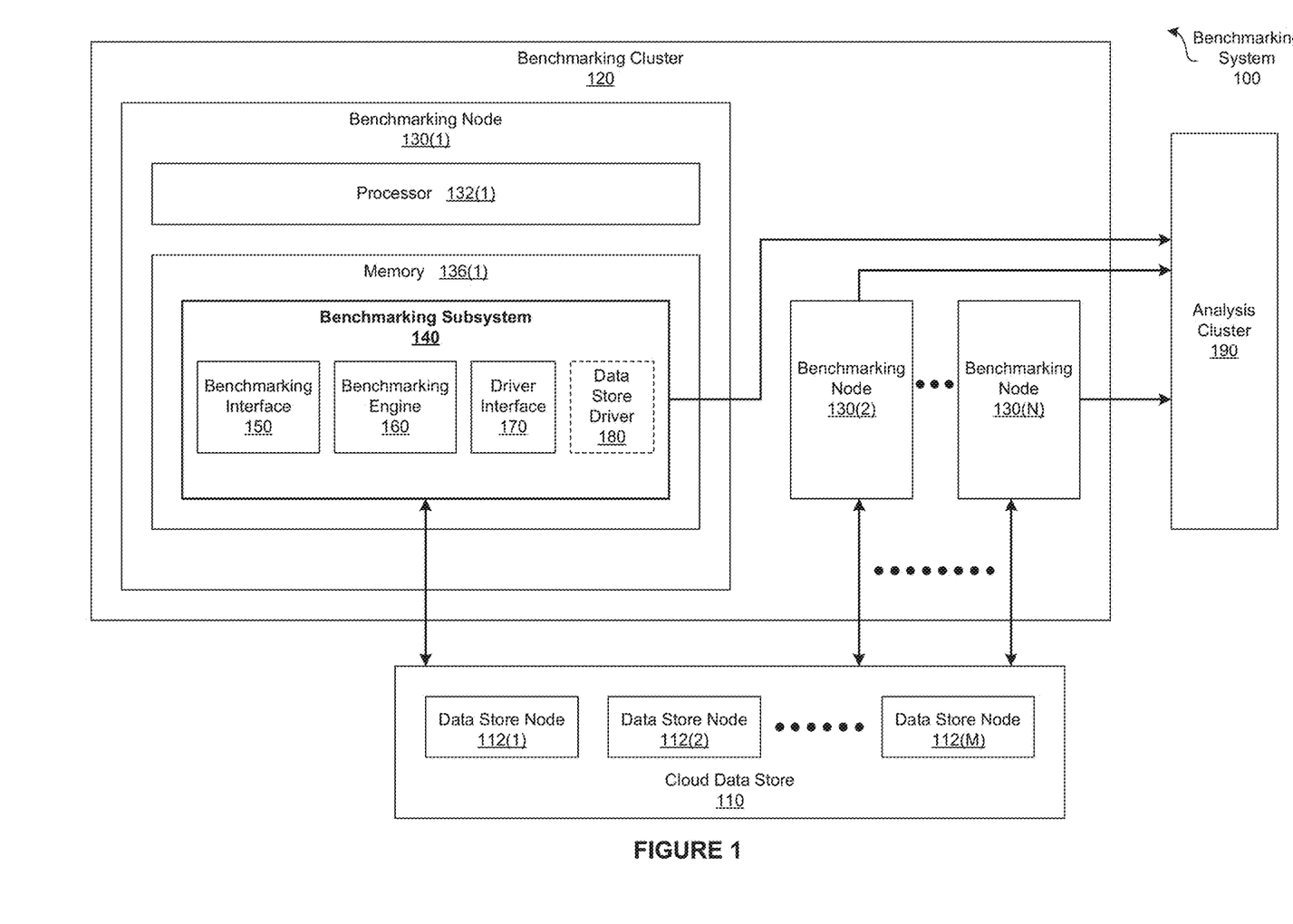
FIG. 1 is a conceptual illustration of a benchmarking system configured to implement one or more aspects of the present invention.

FIG. 1 is a conceptual illustration of a benchmarking system 100 configured to implement one or more aspects of the present invention. As shown, the benchmarking system 100 includes, without limitation, a cloud data store 110, a benchmarking cluster 120, and an analysis cluster 190. In alternate embodiments, the benchmarking system 100 may include any number of cloud data stores 110, any number of benchmarking clusters 120, and any number of analysis clusters 190. For explanatory purposes, multiple instances of like objects are denoted with reference numbers identifying the object and parenthetical numbers identifying the instance where needed.

The cloud data store 110 executes on a cloud computing platform and is designed to store and manage collections of client data. The cloud data store 110 is also commonly referred to as a "data store cluster." Examples of cloud data stores 110 include Netflix Dynomite, Apache Cassandra, and Amazon Elastic File System, to name a few. As shown, the cloud data store 110 includes, without limitation, any number of data store nodes 112. The data store nodes 112 within the cloud data store 110 are typically interconnected computers or virtual machines, where each computer or virtual machine supplies data store services via a client-server architecture. In alternate embodiments, each of the data store nodes 130 may be any instruction execution system, apparatus, or device capable of executing software applications. The data store nodes 130 may be organized in any technically feasible fashion and across any number of geographical locations.

Oftentimes, the overall functionality and performance of applications that rely on cloud data stores correlate to the functionality and performance of the cloud data stores themselves. Thus, to evaluate applications that rely on the cloud data stores, the cloud data stores also need to be evaluated. However, executing a complex application or system of applications across a wide range of operating conditions to evaluate the functionality and performance of a cloud data store or to compare multiple cloud data stores for a variety of use cases is prohibitively time consuming.

To reduce the time required to evaluate the functionality and performance of a cloud data store, an engineer may implement a conventional benchmarking engine instead of an application or system of applications to test the cloud data store. In operation, the conventional benchmarking engine typically generates different workloads that can be executed on the cloud data store. Workload operations that execute on the cloud data store are referred to herein as "data store operations." During testing, as various data store operations execute on the cloud data store, the conventional benchmarking engine monitors the performance of the cloud data store. In general, the workloads are designed to emulate loads on the cloud data store for one or more use cases.

One limitation of a typical conventional benchmarking engine is that the workloads cannot be adjusted while the conventional benchmarking engine executes. Thus, the workloads cannot be dynamically updated based on the performance of the cloud data store during any given testing scenario. For example, an engineer could want to optimize a number of data store operations per second based on the observed throughput of the cloud data store. However, with a conventional benchmarking engine, the engineer would not be able to adjust the number of data store operations per second without terminating the conventional benchmarking engine, configuring the conventional benchmarking engine to generate a new workload, and re-executing the conventional benchmarking engine. Re-configuring and re-executing the conventional benchmarking engine to modify the workload can dramatically increase the time required to evaluate the cloud data store Another limitation of a typical conventional benchmarking engine is that the conventional benchmarking engine usually executes for a predetermined amount of time and then terminates. Thus, evaluating the performance of a cloud data store with respect to an application that rarely terminates is quite difficult. For example, conventional benchmarking engine testing likely would not be able to detect or indicate the presence of a memory leak that incrementally reduces the amount of available application memory over long periods of time. Such memory leaks could be quite problematic because they could cause a long-running application to terminate unexpectedly.

Efficiently and Flexibly Testing a Cloud Data Store

To enable engineers to more efficiently and flexibly test the cloud data store 110, the benchmarking system 100 includes the benchmarking cluster 120. The benchmarking cluster 120 supports a variety of integration standards, enables dynamic re-configuration of workloads, and executes workloads for indeterminate amounts of time. As shown, the benchmarking cluster 120 includes, without limitation, any number of benchmarking nodes 130. The benchmarking nodes 130 within the benchmarking cluster 120 are typically computers or virtual machines, where each computer or virtual machine independently executes an instance of a benchmarking subsystem 140. The benchmarking nodes 130 may be organized in any technically feasible fashion and across any number of geographical locations.

As shown for the benchmarking node 130(1), each of the benchmarking nodes 130 includes, without limitation, a processor 132 and a memory 136. In alternate embodiments, each of the benchmarking nodes 130 may be configured with any number (including zero) of processors 132 and memories 136, and the configuration of the benchmarking nodes 130 may vary. In other embodiments, each of the benchmarking nodes 130 may be any instruction execution system, apparatus, or device capable of executing software applications. In operation, the processor 132(1) is the master processor of the benchmarking node 130(1), controlling and coordinating operations of other components included in the benchmarking node 130(1).

The memory 136(1) stores content, such as software applications and data, for use by the processor 132(1) of the benchmarking node 130(1). As shown, the memory 136(1) includes, without limitation, the instance of the benchmarking subsystem 140 that executes on the processor 132(1). In a complementary fashion, for each of the other benchmarking nodes 130(2)-130(N), the memory 136(x) includes a different instance of the benchmarking subsystem 140 that executes on the processor 132(x).

As shown, the benchmarking subsystem 140 includes, without limitation, a benchmarking interface 150, a driver interface 170 that interfaces with a data store driver 180, and a benchmarking engine 160. The benchmarking interface 150 may be any type of interface that enables configuration of the benchmarking subsystem 140 via any number and type of configuration data. In some embodiments, the benchmarking interface 150 comprises a graphical user interface (GUI). In other embodiments, the benchmarking interface 150 comprises an application programming interface (API). For instance, in some embodiments, the benchmarking interface 150 may comprise a Representational State Transfer (REST) API. The REST API may support any number and type of data interchange formats, such as JavaScript Object Notation (JSON), HyperText Markup Language (HTTP), and Extensible Markup Language (XML), to name a few.

The configuration data includes, without limitation, a data store selection, a driver configuration, workload properties, a workload type, and benchmarking commands. The data store selection specifies the cloud data store 110 that is to be tested. The driver configuration selects the data store driver 180 through which the benchmarking subsystem 140 interfaces with the cloud data store 110. As depicted with a dotted box, the data store driver 180 implements the driver interface 170 to enable the benchmarking subsystem 140 to interact with the cloud data store 110. More specifically, in some embodiments, the data store driver 180 implements the driver interface 170 to enable the benchmarking subsystem 140 to:

initialize the cloud data store 110,
 shutdown the cloud data store 110,
 perform a single read operation on the cloud data store 110,
 perform a single write operation on the cloud data store 110,
 get connection information from the cloud data store 110, and
 run a workflow for a functional test on the cloud data store 110.

The workload properties, the workload type, and the benchmarking commands configure the benchmarking engine 160. When configured to test the cloud data store 110, the benchmarking engine 160 generates a workload based on the workload properties and the workload type and causes the workload to execute on the cloud data store 110. For each of the benchmarking nodes 130, the workload properties and the workload type may be specified separately via the benchmarking interface 150. Accordingly, the various instances of the benchmarking engine 160 included in the different instances of the benchmarking subsystems 140 may be configured to generate different workloads. As a general matter, the workload properties may include any number and type of data, and the benchmarking engine 160 may generate the workload based on the workload properties in any technically feasible fashion.

For instance, in some embodiments, the workload properties include, without limitation:
 numKeys that specifies the sample space for randomly generated keys,
 numValues that specifies the sample space for generated values,
 dataSize that specifies the size of each value,
 numWriters that specifies the number of threads per benchmarking node 130 that execute write operations on the cloud data store 110,
 numReaders that specifies the number of threads per benchmarking node 130 that execute read operations on the cloud data store 110,
 writeEnabled that enables or disables write operations on the cloud data store 110,
 readEnabled that enables or disables read operations on the cloud data store 110,
 writeRateLimit that specifies the number of write operations per second on the cloud data store 110
 readRateLimit that specifies the number of read operations per second on the cloud data store 110
 userVariableDataSize that enables or disables the ability of the payload to be randomly generated In general, the workload type specify a different pluggable workload traffic pattern. For instance, in some embodiments, the workload type specifies random traffic pattern, a sliding window traffic pattern, or sliding window flip traffic pattern. The sliding window traffic pattern specifies a workload that concurrently exercises data that is repetitive inside a window, thereby providing a combination of temporally local data and spatially local data. For example, the window could be designed to exercise both a caching layer provided by the cloud data store 110 and the Input/Output Operations Per Second (IOPS) of a disk managed by the cloud data store 110.

The workload generation commands may configure any number of the instances of the benchmarking engine 160 to start, pause, and/or finish generating and executing the workload in any technically feasible fashion. For example, if a "run writes" command and a single benchmarking node 130 is selected, then the instance of the benchmarking engine 160 associated with the selected benchmarking node 130 executes write operations on the cloud data store 110. By contrast, if "run writes" and "run reads" commands and multiple benchmarking nodes 130 are selected, then multiple instances of the benchmarking engines 160 independently and substantially in parallel execute write and read operations on the cloud data store 110.

As the cloud data store 110 executes data store operations, the cloud data store 110 transmits results to the benchmarking engine 160. For example, the result of a read operation could be client data and the result of a write operation could be an acknowledgment. The benchmarking engine 160 generates statistics (not shown in FIG. 1) based on the results and transmits the statistics to the benchmarking interface 150 for display purposes. The statistics may include any number and type of data that provide insight into the performance of the cloud data store 110, and the benchmarking engine 160 may generate the statistics in any technically feasible fashion.

The benchmarking engine 160 also transmits the statistics to the analysis cluster 190. In general, the benchmarking subsystem 140 provides plugin functionality that enables the benchmarking engine 160 to interface with any number of compatible analysis clusters 190. The analysis cluster 190 may be any number and type of software applications (e.g., external time series database, monitoring system, etc.) that provides analysis and/or monitoring services. For example, the analysis cluster 190 could include, without limitation, a Netflix Servo interface that exposes publishing metrics in Java, and a Netflix Altas backend that manages dimensional time series data. After the analysis cluster 190 receives the statistics, the analysis cluster 190 generates any number of metrics based on the statistics.

In some alternate embodiments, the benchmarking engine 160 may transmit the statistics to the analysis cluster 190, but may not transmit the statistics to the benchmarking interface 150. In other alternate embodiments, the benchmarking engine 160 may transmit the statistics to the benchmarking interface 150, but may not transmit the statistics to the analysis cluster 190. In such embodiments, the benchmarking system 100 may not include the analysis cluster 190. In various embodiments, the cloud data store 110 may transmit data store statistics to the analysis cluster 190 instead of or in addition to the statistics that the benchmarking engine 160 transmits to the analysis cluster 190.

Notably, while the benchmarking engine 160 generates and executes the workload based on "current" workload properties, the benchmarking engine 160 may be dynamically reconfigured via the benchmarking interface 150. More specifically, the benchmarking engine 160 may receive "new" workload properties via the benchmarking interface 150. In response, the benchmarking engine 160 generates and executes the workload based on the new workload properties instead of the current workload properties without ceasing to generate and execute the workload. Accordingly, the new workload properties become the current workload properties.

In some embodiments, all of the workload properties may be dynamically configured. In other embodiments, one or more of the workload properties may be dynamically configured, while the remaining workload properties are statically configured prior to connecting to the cloud data store 110 and/or generating and executing the workload. For example, in some embodiments, the writeRateLimit and the readRateLimit may be dynamically configured, while the remaining workload properties are statically configured prior to configuring the driver connection. In alternate embodiments, the workload type may be dynamically configured.

In operation, the benchmarking engine 160 continues to generate and execute the workload based on the current workload properties until the benchmarking engine 160 receives a "pause" or an "end" workload generation command via that benchmarking interface 150. Unless an end workload command is received, the benchmarking node 130 continues to generate and execute the workload for an infinite amount of time, thereby efficiently emulating the operating conditions of long-running applications.

In alternate embodiments, the benchmarking interface 150 may be configured to generate an "end" workload generation command in any technically feasible fashion. For example, the benchmarking interface 150 could implement a servlet context listener that detects when an application that is associated with the benchmarking interface 150 is terminated. When the servlet context listener detects that the application is terminated, then the benchmarking interface 150 could generate an end workload generation command. In some embodiments, the workload generation commands may include any number and type of additional commands that customize and/or optimize the benchmarking of the cloud data store 110.

For instance, in some embodiments, the workload generation commands include a "backfill" command. If the benchmarking subsystem 140 receives the backfill command, then the benchmarking subsystem 140 executes one or more write commands on the cloud data store 110 prior to executing the workload. The one or more write commands store initial data in the cloud data store 110. The stored initial data, also commonly referred to as "hot" data, reduces the time required to test the cloud data store 110.

Note that the techniques described herein are illustrative rather than restrictive, and may be altered without departing from the broader spirit and scope of the invention. In particular, the functionality provided by the benchmarking subsystem 140, the benchmarking engine 160, the benchmarking interface 150, the driver interface 170, the data store driver 180, the analysis cluster 190, and the cloud data store 110 may be implemented in any number of software applications in any combination. Further, in various embodiments, any number of the techniques disclosed herein may be implemented while other techniques may be omitted in any technically feasible fashion.

Many modifications and variations on the functionality provided by the benchmarking subsystem 140, the benchmarking engine 160, the benchmarking interface 150, the driver interface 170, the data store driver 180, the analysis cluster 190, and the cloud data store 110 will be apparent to those of ordinary skill in the art without departing from the scope and spirit of the described embodiments. Alternate embodiments include any benchmarking application that enables dynamic reconfiguration of a workload executing on a database and/or generates and executes a workload on the database until explicitly terminated.

Figure 2:
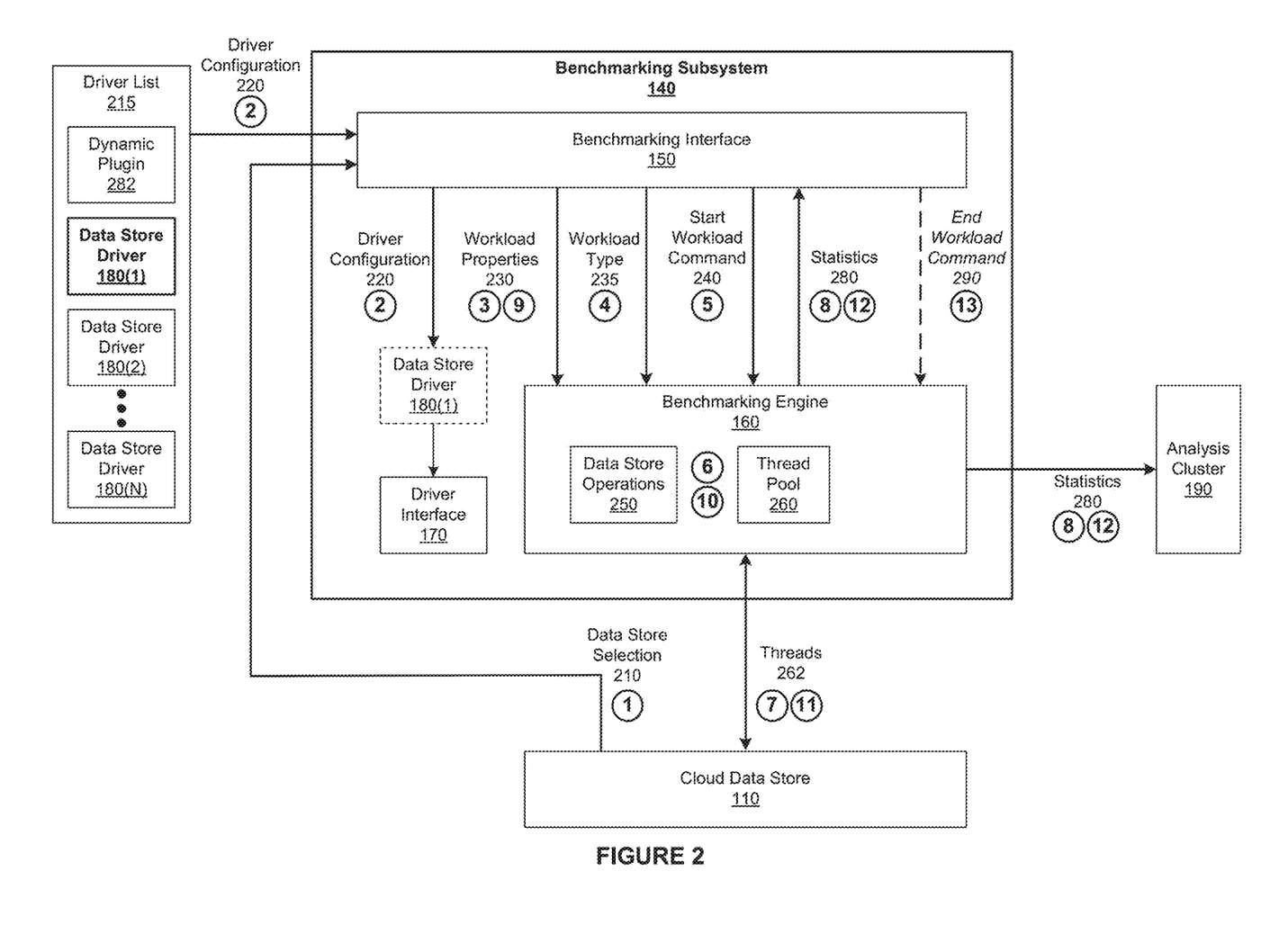
FIG. 2 is a more detailed illustration of the operations performed by the benchmarking subsystem of FIG. 1 when testing a cloud data store, according to various embodiments of the present invention.

FIG. 2 is a more detailed illustration of the operations performed by the benchmarking subsystem 140 of FIG. 1 when testing the cloud data store 110, according to various embodiments of the present invention. For explanatory purposes only, FIG. 2 depicts a sequence of events involved in testing the cloud data store 110 with circles that are labeled 1 through 13. In alternate embodiments, the number and sequence of events involved in testing the cloud data store 110 may vary.

First, as depicted with the circle labeled 1, the benchmarking subsystem 140 receives a data store selection 210 via the benchmarking interface 150. As shown, the data store selection 210 specifies that the cloud data store 110 is to be the target of testing operations. The benchmarking subsystem 140 may enable the specification of the data store selection 210 in any technically feasible fashion. For example, in various embodiments, the benchmarking subsystem 140 could identify a number of available cloud data stores 110 via a discovery process and configure the benchmarking interface 150 to display the available cloud data stores 110 in a selection window.

Subsequently, as depicted with the circle labeled 2, the benchmarking subsystem 140 receives a driver configuration 220 that configures the benchmarking subsystem 140 to interface with the cloud data store 110 via the data store driver 180(1). In operation, upon receiving the driver configuration 220 that specifies the data store driver 180(1), the benchmarking subsystem 140 connects to the cloud data store 110 via the data store driver 180(1).

As shown, the data store driver 180(1) is included in a driver list 215 that includes, without limitation, any number of the data store drivers 180 and a dynamic plugin 282. As a general matter, each of the data store drivers 180 and the dynamic plugin 282 implement the driver interface 170. The data store drivers 180 are typically written in a programming language and, consequently, are configured statically. Examples of the data store drivers 180 include DataStax Java Driver (Cassandra Query Language), Cassandra Astyanax (Thrift), ElasticSearch API, and Dyno (Jedis support). By contrast, the dynamic plugin 282 is dynamically configured via a script that is written in a scripting language, such as Groovy. In alternate embodiments, the driver list 215 may include any number and type of software applications that implement the driver interface 170.

Subsequently, as depicted with the circle numbered 3, the benchmarking engine 160 receives workload properties 230 via the benchmarking interface 150. The benchmarking engine 160 may receive any number and type of workload properties 230 in any technically feasible fashion. Similarly, as depicted with the circle numbered 5, the benchmarking engine 160 receives a workload type 235. As depicted with the circle numbered 6, the benchmarking engine 160 then receives a start workload command 240 that configures the benchmarking engine 160 to generate and execute the workload based on the workload properties 230 and the workload type 235.

As part of generating and executing the workload, the benchmarking engine 160 configures a thread pool 260 that includes any number of threads 262 that execute on the cloud data store 110. More specifically, the benchmarking engine 160 performs operations that configure the thread pool 260 based on the workload properties 230. The benchmarking engine 160 may configure the thread pool 260 based on any number and type of the workload properties 230. For instance, in some embodiments, the benchmarking engine 160 configures the thread pool 260 to include a number of the threads 262 that execute read operations on the cloud data store 110 based on the benchmarking parameter 230 "numReaders." The benchmarking engine 160 may configure the thread pool 260 and manage the threads 262 in any technically feasible fashion as known in the art.

After the benchmarking engine 160 configures the thread pool 260, the benchmarking engine generates data store operations 250 based on the workload properties 230 and the workload type 235. The benchmarking engine 160 may generate the data store operations 250 based on any number and type of the workload properties 230 and the workload type 235. For example, the benchmarking engine 160 could generate read operations at a rate that is specified by the benchmarking parameter 230 "readRateLimit" and based on a sliding window traffic pattern that is specified by the workload type 235.

As depicted with the circle labeled 7, as the benchmarking engine 160 generates each of the data store operations 250, the benchmarking engine 160 assigns the data store operation 250 to one of the threads 262 included in the thread pool 260. The thread 262 then executes the data store operation 250 on the cloud data store 110 via the data store driver 180(1). In alternate embodiments, the benchmarking engine 160 may cause the data store operations 250 to execute on the cloud data store 110 in any technically feasible fashion. The processes of generating the data store operations 250 and causing the data store operations 250 to execute on the cloud data store 110 is also referred to herein as "generating and executing the workload."

As the cloud data store 110 executes the data store operations 250, the cloud data store 110 transmits the results to the benchmarking engine 160. The benchmarking engine 160 receives the results of the data store operations 250 and generates statistics 280. The statistics 280 may include any amount and type of data that measures the functionality and/or performance of the cloud data store 110. As depicted with the circles labeled 8, the benchmarking engine 160 transmits the statistics 280 to the analysis cluster 190 and the benchmarking interface 150. The benchmarking interface 150 then displays the statistics 280.

As a general matter, the benchmarking engine 160 is configured to execute multiple operations during the benchmarking process substantially in parallel. For example, the benchmarking engine 160 typically generates the statistics 280 associated with the data store operations 250 that have finished executing on the cloud data store 110 data store while generating new data store operations 250.

Dynamically Re-Configuring a Workload

In particular, as depicted with the circle labeled 9, as the benchmarking engine 160 generates and executes the workload based on current workload properties 230 and the workload type 235, the benchmarking engine 160 receives new workload properties 230. As depicted with the circle labeled 10, the benchmarking engine 160 modifies the workload based on the new workload properties 230. More specifically, if the new workload properties 230 are associated with the thread pool 260, then the benchmarking engine 160 re-configures the thread pool 260. For example, the benchmarking engine 160 could increase or decrease the number of threads 262 that are included in the thread pool 260. Further, the benchmarking engine 160 generates subsequent data store operations 250 based on the new workload properties 230 instead of the current workload properties 230. Accordingly, the new workload properties 230 become the current workload properties 230.

As depicted with the circle labeled 10, the benchmarking engine 160 continues to assign the data store operations 250 to the threads 262 that execute the data store operations 250 on the cloud data store 110. In a complementary fashion, as depicted with the circle labeled 12, the benchmarking engine 160 continues to generate and transmit the statistics 280 to the analysis cluster 190 and the benchmarking interface 150. Such a process causes the benchmarking interface 150 to dynamically display the statistics 280. The benchmarking subsystem 140 continues to perform testing operations in this fashion until the benchmarking subsystem 140 receives an end workload command 290 (depicted with the circle labeled 13) via the benchmarking interface 150.

Figure 3:
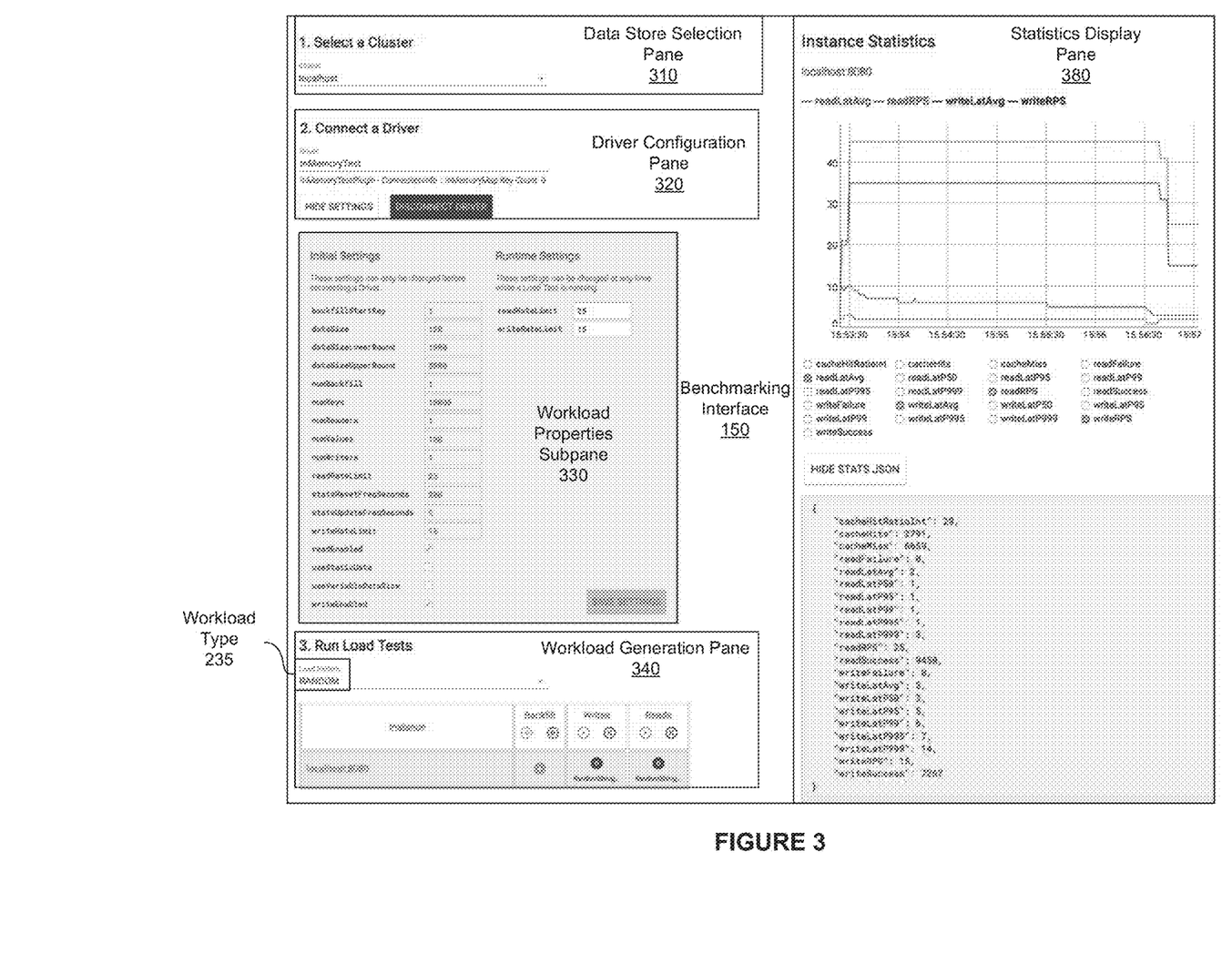
FIG. 3 illustrates an example configuration of the benchmarking interface of FIG. 2, according to various embodiments of the present invention.

FIG. 3 illustrates an example configuration of the benchmarking interface 150 of FIG. 2, according to various embodiments of the present invention. As shown, the benchmarking interface 150 includes, without limitation, the data store selection pane 310, the driver configuration pane 320, the workload properties subpane 332, the workload generation pane 340, and the statistics display pane 380. In alternate embodiments, the benchmarking interface 150 may include any number and type of interface widgets (e.g., panes, sliders, buttons, menus, etc.) that enable an engineer to configure and execute the benchmarking subsystem 140 to test the cloud data store 110. In yet other alternate embodiments, the benchmarking interface 150 may be replaced with an API.

As shown, the data store selection pane 310 identifies the data store selection 210 of the cloud data store 110 "localhost." The driver configuration pane 320 identifies that the benchmarking subsystem 140 is connected to the cloud data store 110 via the data store driver 180(1) "InMemoryTest." The workload properties subpane 330 displays the values for the workload properties 230. As shown, the workload properties 230 include "initial settings" and "runtime settings." The initial settings can be modified before the benchmarking engine 160 connects to the cloud data store 110 via the data store driver 180(1). By contrast, the runtime settings can be modified at any time.

The workload generation pane 340 identifies that the benchmarking engine 160 included in the benchmarking node 130 "localhost:8080" is generating and executing a workload on the data store 110. The workload generation pane 340 further identifies that the workload is of the workload type 235 "random." In a complementary fashion, the statistics display pane 380 displays a selection of the statistics 280 that the benchmark engine 160 included in the benchmarking node 130 generates based on the results received from the data store 210.

Figure 4:
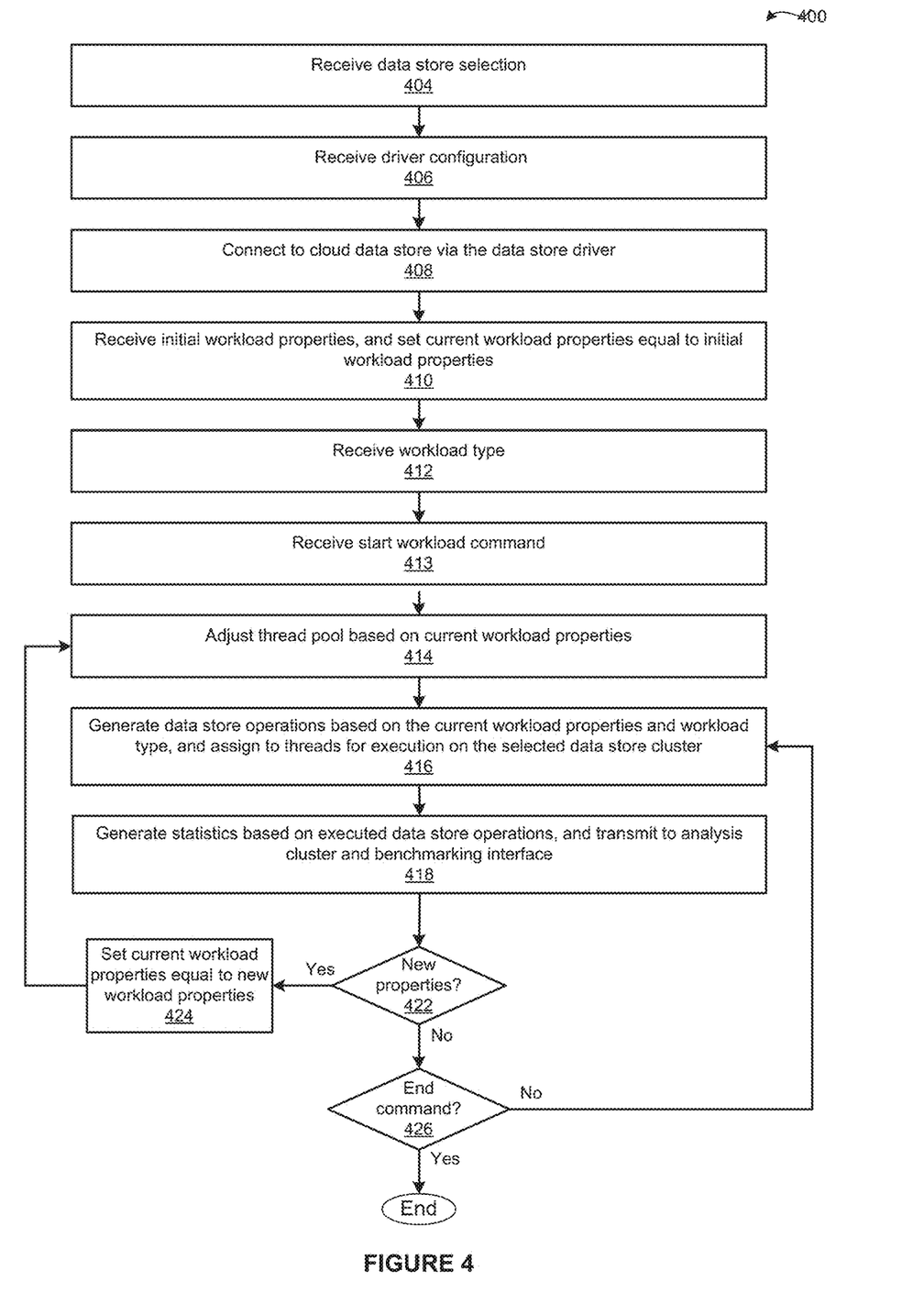
FIG. 4 is a flow diagram of method steps for testing a cloud data store, according to various embodiments of the present invention.

FIG. 4 is a flow diagram of method steps for testing a cloud data store, according to various embodiments of the present invention. Although the method steps are described with reference to the systems of FIGS. 1-3, persons skilled in the art will understand that any system configured to implement the method steps, in any order, falls within the scope of the present invention. For explanatory purposes only, the context of FIG. 4 is that a single instance of the benchmarking subsystem 140 included in a single benchmarking node 130 is executing the method steps. As a general matter, any number of instances of the benchmarking subsystem 140 included in any number of the benchmarking nodes 130 may execute any number of the method steps independently and substantially in parallel As shown, a method 400 begins at step 404, where the benchmarking subsystem 140 receives the data store selection 210 via the benchmarking interface 150. The data store selection 210 specifies the cloud data store 110. At step 406, the benchmarking subsystem 140 receives the driver configuration 220 via the benchmarking interface. The driver configuration 220 requests that the benchmarking engine 160 interface with the cloud data store 110 via the data store driver 180(1). At step 408, the benchmarking engine 160 connects to the cloud data store 110 via the data store driver 180(1).

At step 410, the benchmarking engine 160 receives the workload properties 230 via the benchmarking interface 150, and the benchmarking engine 160 sets "current" workload properties 230 equal to the workload properties 230. At step 412, the benchmarking engine 160 receives the workload type 235 via the benchmarking interface 150. At step 413, the benchmarking engine 160 receives the start workload command 240 via the benchmarking interface 150.

At step 414, the benchmarking engine 160 configures the thread pool 260 based on the current workload properties 230. At step 416, the benchmarking engine 160 generates the data store operations 250 based on the current workload properties 230 and the workload type 235. As the benchmarking engine 160 generates each of the data store operations 250, the benchmarking engine 160 assigns the data store operation 250 to one of the threads 262 included in the thread pool 260 for execution on the cloud data store 110 via the data store driver 180(1).

At step 416, the benchmarking engine 160 receives results of the executed data store operations 250 from the cloud data store 110, generates the statistics 280 based on the results, and transmit the statistics 280 to the analysis cluster 190 and the benchmarking interface 150. The benchmarking interface 150 displays the statistics 280 via the statistics display pane 380. At step 422, the benchmarking engine 160 determines whether the benchmarking engine 160 has received new workload properties 230 via the benchmarking interface 150.

If, at step 422, the benchmarking engine 160 determines that the benchmarking engine 160 has received new workload properties 230, then the method 400 proceeds to step 424. At step 424, the benchmarking engine sets the current workload properties 230 equal to the new workload properties 230, and the method 400 returns to step 414 where the benchmarking engine 160 adjusts the workload based on the current workload properties 230. The benchmarking engine 160 continues to cycle through steps 414-424, dynamically adjusting the workload based on new workload properties 230 until the benchmarking engine 160 does not receive any new workload properties 230.

If, however, at step 422, the benchmarking engine 160 determines that the benchmarking engine 160 has not received any new workload properties 230, then the method 400 proceeds directly to step 426. At step 426, the benchmarking engine 160 determines whether the benchmarking engine 160 has received the end workload command 290. If, at step 426, the benchmarking engine 160 determines that the benchmarking engine 160 has not received the end workload command 290, then the method 400 returns to step 416, where the benchmarking engine 160 continues to generate the data store operations 250. The benchmarking engine 160 continues to cycle through steps 416-426, generating and executing the workload until the benchmarking engine 160 receives the end workload command 290. If, however, at step 426, the benchmarking engine 160 determines that the benchmarking engine 160 has received the end workload command, then the method 400 terminates.

In sum, the disclosed techniques may be used to test a cloud data store. A benchmarking subsystem includes, without limitation, a benchmarking interface, a driver interface, and a benchmarking engine. The benchmarking interface enables selection of a cloud data store and a data store driver, dynamic specification of workload properties, and generation and execution of a workload on the cloud data store. The driver interface enables the benchmarking engine to interface with the cloud data store via a compatible data store driver.

To test the cloud data store, the benchmarking engine generates data store operations based on the workload properties and a workload type. The benchmarking engine attaches the data store operations to threads that execute on the cloud data store via the data store driver. As the cloud data store executes the data store operations, the benchmarking engine generates statistics based on the results of the executed data store operations. The benchmarking engine transmits the statistics to an analysis cluster that performs any number of analysis operations. The benchmarking engine also transmits the metrics to the benchmarking interface for display purposes.

Notably, the workload properties may be dynamically updated via the benchmarking interface while the benchmarking engine generates and executes data store operations without terminating the benchmarking engine. Upon receiving new workload properties, the benchmarking engine generates data store operations based on the new workload properties instead of the previously specified workload properties. As a general matter, the benchmarking engine continues to generate data store operations based on the current workload properties until the benchmarking engine receives an end command via the benchmarking interface.

Advantageously, the benchmarking subsystem may be configured to automatically test data stores for use cases that are not efficiently supported by conventional benchmarking engines. Unlike conventional benchmarking engines, because the workload properties may be updated without terminating the benchmarking engine, a user may adjust the workload based on the statistics generated by the benchmarking engine. Fine-turning the workload as the benchmarking engine executes can dramatically reduce the time required to evaluate the performance of the cloud data store. Further, because the benchmarking engine executes until receiving an end command, the benchmarking engine may be configured to provide statistics for long-running use cases that are not supported by conventional benchmarking engines. Finally, because the benchmarking subsystem implements a variety of flexible interfaces, the benchmarking engine may be integrated with a wide range of cloud data stores, data store drivers, analysis clusters, cloud services, and the like.

1. In some embodiments, a method comprises processing one or more workload generation operations to generate a first plurality of data store operations based on first configuration data; executing at least one of the data store operations included in the first plurality of data store operations on a data store to obtain first statistics that are associated with a performance of the data store; while continuing to process the one or more workload generation operations, receiving second configuration data, modifying the one or more workload generation operations to generate a second plurality of data store operations based on the second configuration data, executing at least one of the data store operations included in the second plurality of data store operations on the data store to obtain second statistics that are associated with the performance of the data store; and displaying or transmitting for further processing at least one of the first statistics and the second statistics.

2. The method of clause 1, further comprising receiving an end command and, in response, ceasing to process the workload generation operations.

3. The method of clauses 1 or 2, further comprising, prior to processing the one or more workload generation operations, receiving a first command that specifies the data store; receiving a second command that specifies a driver; and establishing a connection to the data store through the driver.

4. The method of any of clauses 1-3, wherein the driver comprises a driver application that is written in a programming language or a dynamic plugin that is associated with a script.

5. The method of any of clauses 1-4, wherein executing at least one of the data store operations included in the first plurality of data store operations comprises assigning the at least one of the data store operations to at least one thread included in a thread pool to generate at least one configured thread; and causing the data store to execute the at least one configured thread.

6. The method of any of clauses 1-5, further comprising, prior to modifying the one or more workload generation operations, modifying a number of threads included in the thread pool based on the second configuration data.

7. The method of any of clauses 1-6, further comprising, while continuing to process the one or more workload generation operations, receiving at least one subsequent configuration data; and for each subsequent configuration data included in the at least one subsequent configuration data, modifying the one or more workload generation operations to generate a subsequent plurality of data store operations based on the subsequent configuration data, executing at least one of the data store operations included in the subsequent plurality of data store operations on the data store to obtain subsequent statistics that are associated with the performance of the data store, and displaying or transmitting for further processing the subsequent statistics.

8. The method of any of clauses 1-7, wherein the first configuration data includes at least one of a rate of read operations, a rate of write operations, a number of threads, a size of data, and a traffic pattern.

9. The method of any of clauses 1-8, wherein the second configuration data includes at least one of an updated rate of read operations, an updated rate of write operations, and an updated number of threads.

10. In some embodiments, a computer-implemented computer-readable storage medium includes instructions that, when executed by a processor, cause the processor to perform the steps of establishing a connection to a data store through a driver; generating a first workload based on first configuration data; causing the first workload to execute on the data store to obtain first statistics that are associated with a performance of the data store and the first configuration data; while remaining connected to the data store, generating a second workload based on second configuration data, causing the second workload to execute on the data store to obtain second statistics that are associated with the performance of the data store and the second configuration data; and displaying or transmitting for further processing at least one of the first statistics and the second statistics.

11. The computer-implemented method of claim 10, wherein generating the first workload comprises processing one or more workload generation operations to generate a first plurality of data store operations based on the first configuration data; and generating the second workload comprises modifying the one or more workload generation operations to generate a second plurality of data store operations based on the second configuration data.

12. The computer-readable storage medium of clauses 10 or 11, further comprising receiving an end command and, in response, ceasing to process the one or more workload generation operations.

13. The computer-readable storage medium of any of clauses 10-12, wherein the first workload comprises a plurality of data store operations, and causing the first workload to execute on the data store comprises assigning at least one of the data store operations included in the plurality of data store operations to at least one thread included in a thread pool to generate at least one configured thread; and causing the data store to execute the at least one configured thread.

14. The computer-readable storage medium of any of clauses 10-13, further comprising, prior to generating the second workload, modifying a number of threads included in the thread pool based on the second configuration data.

15. The computer-readable storage medium of any of clauses 10-14, wherein the first configuration data includes at least one of a rate of read operations, a rate of write operations, a number of threads, a size of data, and a traffic pattern.

16. The computer-readable storage medium of any of clauses 10-15, wherein the traffic pattern comprises a sliding window of data that is characterized by at least one of temporally proximate data and spatially proximate data.

17. The computer-readable storage medium of any of clauses 10-16, wherein transmitting at least one of the first statistics and the second statistics comprises transmitting at least one of the first statistics and the second statistics to an analysis application for further processing.

18. In some embodiments, a system comprises a memory storing instructions associated with a benchmarking engine; and a processor that is coupled to the memory and, when executing the instructions, is configured to process one or more workload generation operations to generate a first plurality of data store operations based on first configuration data; assign at least one of the data store operations included in the first plurality of data store operations to at least a first thread included in a thread pool to generate at least a first configured thread; cause the data store to execute the at least a first configured thread to obtain first statistics that are associated with a performance of the data store; while continuing to process the one or more workload generation operations, receive second configuration data, modify at least one of the workload generation operations and the thread pool based on the second configuration data, assign at least one of the data store operations included in the second plurality of data store operations to at least a second thread included in the thread pool to generate at least a second configured thread; and cause the data store to execute the at least a second configured thread to obtain second statistics that are associated with the performance of the data store; and display or transmit for further processing at least one of the first statistics and the second statistics.

19. The system of clause 18, wherein the processor is further configured to receive an end command and, in response, cease to process the workload generation operations.

20. The system of clause 18 or 19, wherein the first configuration data includes at least one of a rate of read operations, a rate of write operations, a number of threads, a size of data, and a traffic pattern.

21. The system of any of clauses 18-20, wherein the processor is further configured to, prior to processing the one or more workload generation operations, generate one or more write operations that store initial data in the data store.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
processing one or more workload generation operations to generate a first plurality of data store operations based on first configuration data, wherein the first configuration data comprises a workload traffic pattern for the first plurality of data store operations, and wherein the workload traffic pattern specifies at least one of a temporal proximity of the first plurality of data store operations or a spatial proximity of data within a data store;
executing at least one of the data store operations included in the first plurality of data store operations on the data store to obtain first statistics that are associated with a performance of the data store; and while continuing to process the one or more workload generation operations:
  receiving second configuration data;
  modifying the one or more workload generation operations to generate a second plurality of data store operations based on the second configuration data;
  executing at least one of the data store operations included in the second plurality of data store operations on the data store to obtain second statistics that are associated with the performance of the data store; and
  displaying or transmitting for further processing at least one of the first statistics and the second statistics.

2. The computer-implemented method of claim 1, further comprising receiving an end command and, in response, ceasing to process the one or more workload generation operations.

3. The computer-implemented method of claim 1, further comprising, prior to processing the one or more workload generation operations:
  receiving a first command that specifies the data store;
  receiving a second command that specifies a driver; and
  establishing a connection to the data store through the driver.

4. The computer-implemented method of claim 3, wherein the driver comprises a driver application that is written in a programming language or a dynamic plugin that is associated with a script.

5. The computer-implemented method of claim 1, wherein executing the at least one of the data store operations included in the first plurality of data store operations comprises:
  assigning the at least one of the data store operations to at least one thread included in a thread pool to generate at least one configured thread; and
  causing the data store to execute the at least one configured thread.

6. The computer-implemented method of claim 5, further comprising, prior to modifying the one or more workload generation operations, modifying a number of threads included in the thread pool based on the second configuration data.

7. The computer-implemented method of claim 1, further comprising, while continuing to process the one or more workload generation operations:
  receiving at least one subsequent configuration data; and
  for each subsequent configuration data included in the at least one subsequent configuration data:
    modifying the one or more workload generation operations to generate a subsequent plurality of data store operations based on the subsequent configuration data,
    executing at least one of the data store operations included in the subsequent plurality of data store operations on the data store to obtain subsequent statistics that are associated with the performance of the data store, and
    displaying or transmitting for further processing the subsequent statistics.

8. The computer-implemented method of claim 1, wherein the first configuration data further includes at least one of a rate of read operations, a rate of write operations, a number of threads executing the read operations, or a number of threads executing the write operations.

9. The computer-implemented method of claim 8, wherein the second configuration data includes at least one of an updated rate of read operations, an updated rate of write operations, and an updated number of threads.

10. A non-transitory computer-readable storage medium including instructions that, when executed by a processor, cause the processor to perform the steps of:
  establishing a connection to a data store through a driver;
  generating a first workload based on first configuration data, wherein the first configuration data comprises a workload traffic pattern for a first plurality of data store operations, and wherein the workload traffic pattern specifies at least one of a temporal proximity of the first plurality of data store operations or a spatial proximity of data within the data store;
  causing the first workload to execute on the data store to obtain first statistics that are associated with a performance of the data store and the first configuration data; and
  while remaining connected to the data store:
    generating a second workload based on second configuration data,
    causing the second workload to execute on the data store to obtain second statistics that are associated with the performance of the data store and the second configuration data; and
    displaying or transmitting for further processing at least one of the first statistics and the second statistics.

11. The non-transitory computer-readable storage medium of claim 10, wherein generating the first workload comprises processing one or more workload generation operations to generate the first plurality of data store operations based on the first configuration data; and generating the second workload comprises modifying the one or more workload generation operations to generate a second plurality of data store operations based on the second configuration data.

12. The non-transitory computer-readable storage medium of claim 11, further comprising receiving an end command and, in response, ceasing to process the one or more workload generation operations.

13. The non-transitory computer-readable storage medium of claim 10, wherein the first workload comprises the first plurality of data store operations, and causing the first workload to execute on the data store comprises:
  assigning at least one of the data store operations included in the first plurality of data store operations to at least one thread included in a thread pool to generate at least one configured thread; and
  causing the data store to execute the at least one configured thread.

14. The non-transitory computer-readable storage medium of claim 13, further comprising, prior to generating the second workload, modifying a number of threads included in the thread pool based on the second configuration data.

15. The non-transitory computer-readable storage medium of claim 10, wherein the first configuration data includes at least one of a rate of read operations or a rate of write operations.

16. The non-transitory computer-readable storage medium of claim 15, wherein the workload traffic pattern comprises a sliding window associated with the first plurality of data store operations.

17. The non-transitory computer-readable storage medium of claim 10, wherein transmitting at least one of the first statistics and the second statistics comprises transmitting at least one of the first statistics and the second statistics to an analysis application for further processing.

18. A system comprising:
a memory storing instructions associated with a benchmarking engine; and
a processor that is coupled to the memory and, when executing the instructions, is configured to:
process one or more workload generation operations to generate a first plurality of data store operations based on first configuration data, wherein the first configuration data comprises a workload traffic pattern for the first plurality of data store operations, and wherein the workload traffic pattern specifies at least one of a temporal proximity of the first plurality of data store operations or a spatial proximity of data within a data store;
assign at least one of the first plurality of data store operations included in the first plurality of data store operations to at least a first thread included in a thread pool to generate at least a first configured thread;
cause the data store to execute the at least a first configured thread to obtain first statistics that are associated with a performance of the data store; and
while continuing to process the one or more workload generation operations:
receive second configuration data,
modify at least one of the workload generation operations and the thread pool based on the second configuration data,
assign at least one of the data store operations included in the second plurality of data store operations to at least a second thread included in the thread pool to generate at least a second configured thread; and
cause the data store to execute the at least a second configured thread to obtain second statistics that are associated with the performance of the data store; and
display or transmit for further processing at least one of the first statistics and the second statistics.

19. The system of claim 18, wherein the processor is further configured to receive an end command and, in response, cease to process the workload generation operations.

20. The system of claim 18, wherein the first configuration data further includes at least one of a rate of read operations, a rate of write operations, and a number of threads.

21. The system of claim 18, wherein the processor is further configured to, prior to processing the one or more workload generation operations, generate one or more write operations that store initial data in the data store.

* * * * *